United States Patent [19]
Seki et al.

[11] Patent Number: 5,610,680
[45] Date of Patent: Mar. 11, 1997

[54] DISTANCE MEASURING APPARATUS FOR A CAMERA

[75] Inventors: Yoichi Seki; Michio Kawai; Hiroyuki Saito; Akira Ito, all of Yotsukaido, Japan

[73] Assignee: Seiko Precison Inc., Japan

[21] Appl. No.: 449,816

[22] Filed: May 24, 1995

[30] Foreign Application Priority Data

May 24, 1994 [JP] Japan .................................. 6-109780
May 9, 1995 [JP] Japan .................................. 7-110727

[51] Int. Cl.$^6$ ........................................ G03B 3/00
[52] U.S. Cl. ............................................ 396/106
[58] Field of Search ........................................ 354/403

[56] References Cited

U.S. PATENT DOCUMENTS

| | | | |
|---|---|---|---|
| 4,542,971 | 9/1985 | Numata | 354/403 |
| 4,673,274 | 6/1987 | Nagaoka et al. | 354/403 |
| 5,008,695 | 4/1991 | Nagaoka et al. | 354/403 |
| 5,082,363 | 1/1992 | Nakanishi et al. | 354/403 |
| 5,128,529 | 7/1992 | Nagaoka et al. | 354/403 |
| 5,150,128 | 9/1992 | Kongelbeck | 342/174 |
| 5,157,435 | 10/1992 | Min et al. | 354/403 |
| 5,166,723 | 11/1992 | Yoshida et al. | 354/403 |
| 5,321,460 | 6/1994 | Yoshida | 354/403 |
| 5,389,996 | 2/1995 | Oda et al. | 354/403 |
| 5,444,511 | 8/1995 | Seki et al. | 354/403 |

FOREIGN PATENT DOCUMENTS

| | | |
|---|---|---|
| 2247534 | 3/1992 | United Kingdom . |
| 8304435 | 12/1983 | WIPO . |

*Primary Examiner*—Safet Metjahic
*Assistant Examiner*—Michael Dalakis
*Attorney, Agent, or Firm*—Adams & Wilks

[57] ABSTRACT

A distance measuring apparatus for a camera comprises a light projecting device for projecting light to an object to be photographed, a light receiving circuit for receiving light projected by the light projecting device and reflected by the object to be photographed and for converting the reflected light into first and second output signals, a first selecting device for selecting the first output signal, and a second selecting device for selecting one of the first and second output signals. A first signal processing circuit is connected to the first selecting device for processing the output signal selected by the first selecting device. A second signal processing circuit is connected to the second selecting device for processing the output signal selected by the second selecting device. A first memory stores output signals of the first and second signal processing circuits, the output signals being generated upon operation of the light projecting device when the first selecting device selects the first output signal and the second selecting device selects the second output signal. A second memory stores output signals of the first and second signal processing circuits, the output signals being generated upon operation of the light projecting device when the first and the second selecting devices both select the first output signal. A calculation circuit calculates a distance to the object to be photographed by adjusting an output of the first memory by an output of the second memory.

25 Claims, 14 Drawing Sheets

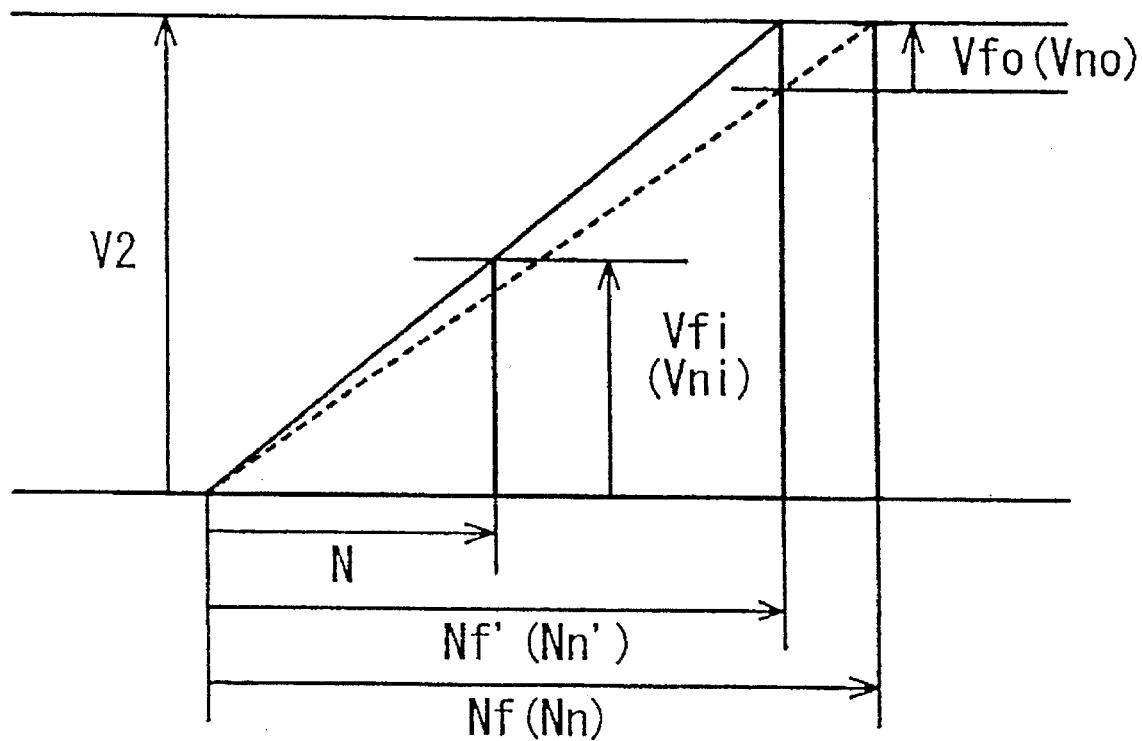
F I G. 7

FIG. 8

| X | D(m) |
|---|---|
| 0.50 | ∞ |
| 0.55 | 3.70 |
| 0.60 | 1.85 |
| 1.00 | 0.37 |

DISTANCE MEASURING APPARATUS FOR A CAMERA

BACKGROUND OF THE INVENTION

1. Field of the Invention

The present invention relates to a distance measuring apparatus for camera or the like.

2. Background Information

Heretofore, there have been proposed various so-called active type measuring apparatuses which use a light projecting element and a light receiving element. One such apparatus is shown in FIG. 14 and calculates the distance to an object to be photographed by activating a light emitting element to emit light, receiving the light reflected by the object by a light receiving element, amplifying two signal currents output by the light receiving element by way of separate amplifying circuits having the same circuit construction, subsequently integrating the two signals by two integrating circuits having the same circuit construction and measuring the frequency of light projection or duration of light projection until the integrated voltage exceeds a predetermined voltage.

However, since the distance measuring apparatus shown in FIG. 14 has a plurality of processing systems for the output signals of the light receiving element, such an apparatus exhibits a circuit imbalance due to a difference in the characteristics of individual circuit elements even when the same amplifying circuits and integrating circuits are used. This difference affects the results of distance measurements, thereby generating errors in distance measurement.

SUMMARY OF THE INVENTION

An object of the distance measuring apparatus according to the present invention is to reduce the circuit imbalance between the amplifying and integrating circuits of a plurality of systems used for processing output signals from the light receiving means incorporated in the apparatus by inputting reference signals to each of the inputs, and adjusting the measurement results depending on the integration results.

The foregoing and other objects of the present invention are carried out by a distance measuring apparatus comprising light projecting means for projecting light to an object to be photographed, light receiving means for receiving light projected by the light projecting means and reflected by the object and for converting the reflected light into first and second current outputs, a first current-voltage converting circuit for converting the first current output to a voltage, a second current-voltage converting circuit for converting the second current output to a voltage, first selecting means for selecting an output signal of the first current-voltage converting circuit, second selecting means for selecting an output of the first or second current-voltage converting circuit, a first amplifying circuit connected to the first selecting means for amplifying the output signal selected by the first selecting means, and a second amplifying circuit connected to the second selecting means for amplifying the output signal selected by the second selecting means. Also provided are a first integrating circuit for integrating an output of the first amplifying circuit, a second integrating circuit for integrating an output of the second amplifying circuit, first memory means for storing in digital form the output voltages of the first and second integrating circuits, the output voltages being generated upon operation of the light projecting means when the first selecting means selects the first current-voltage converting circuit and the second selecting means selects the second current-voltage converting circuit, second memory means for storing in digital form output voltages of the first and second integrating circuits, the output voltages being generated upon operation of the light projecting means when the first and the second selecting means both select the first current-voltage converting means, and calculating means for calculating a distance to the object to be photographed by adjusting the output of the first memory means by an output of the second memory means.

In another embodiment, a distance measuring apparatus for a camera comprises light projecting means for projecting light to an object to be photographed, light receiving means for receiving light projected by the light projecting means and reflected by the object and for converting the reflected light into first and second current outputs, a first current-voltage converting circuit for converting the first current output to a voltage, a second current-voltage converting circuit for converting the second current output to a voltage, reference voltage generating means for generating a reference pulse voltage, first selecting means for selecting either an output of the first current-voltage converting circuit or an output of the reference voltage generating means, second selecting means for selecting an output of either the second current-voltage converting circuit or the reference voltage generating means, a first amplifying circuit connected to the first selecting means for amplifying the output voltage selected by the first selecting means, a second amplifying circuit connected to the second selecting means for amplifying the output voltage selected by the second selecting means, a first integrating circuit for integrating an output voltage of the first amplifying circuit, and a second integrating circuit for integrating an output voltage of the second amplifying circuit. Also provided are first memory means for storing in digital form the output voltages of the first and second integrating circuits, the output voltages being generated upon operation of the light projecting means when the first selecting means selects the first current-voltage converting circuit and the second selecting means selects the second current-voltage converting circuit, second memory means for storing in digital form output voltages of the first and second integrating circuits, the output voltages being generated upon operation of the light projecting means when the first and second memory means both select the reference voltage generating means, and calculating means for calculating a distance of the object to be photographed by adjusting an output of the first memory means by an output of the second memory means.

Prior to measurement of a distance, an output signal is transmitted to each of two processing systems from the same terminal of a light receiving element, and the processing systems process the output signal and store a result of amplification and integration in each of the two processing systems as adjustment information. Subsequently, two output signals from two terminals of the light receiving element are generated to measure a distance. Finally, the result of the distance measurement is adjusted based on the adjustment information to determine a distance to an object to be photographed.

BRIEF DESCRIPTION OF THE DRAWINGS

FIG. 7 is an explanatory diagram for explaining a method for calculating the offset voltages Vfd and Vnd according to the first embodiment of the present invention.

FIG. 8 is a table of a ROM 82 for determining a distance from the value X according to the first embodiment of the present invention.

DETAILED DESCRIPTION OF PREFERRED EMBODIMENTS

Figure 1:
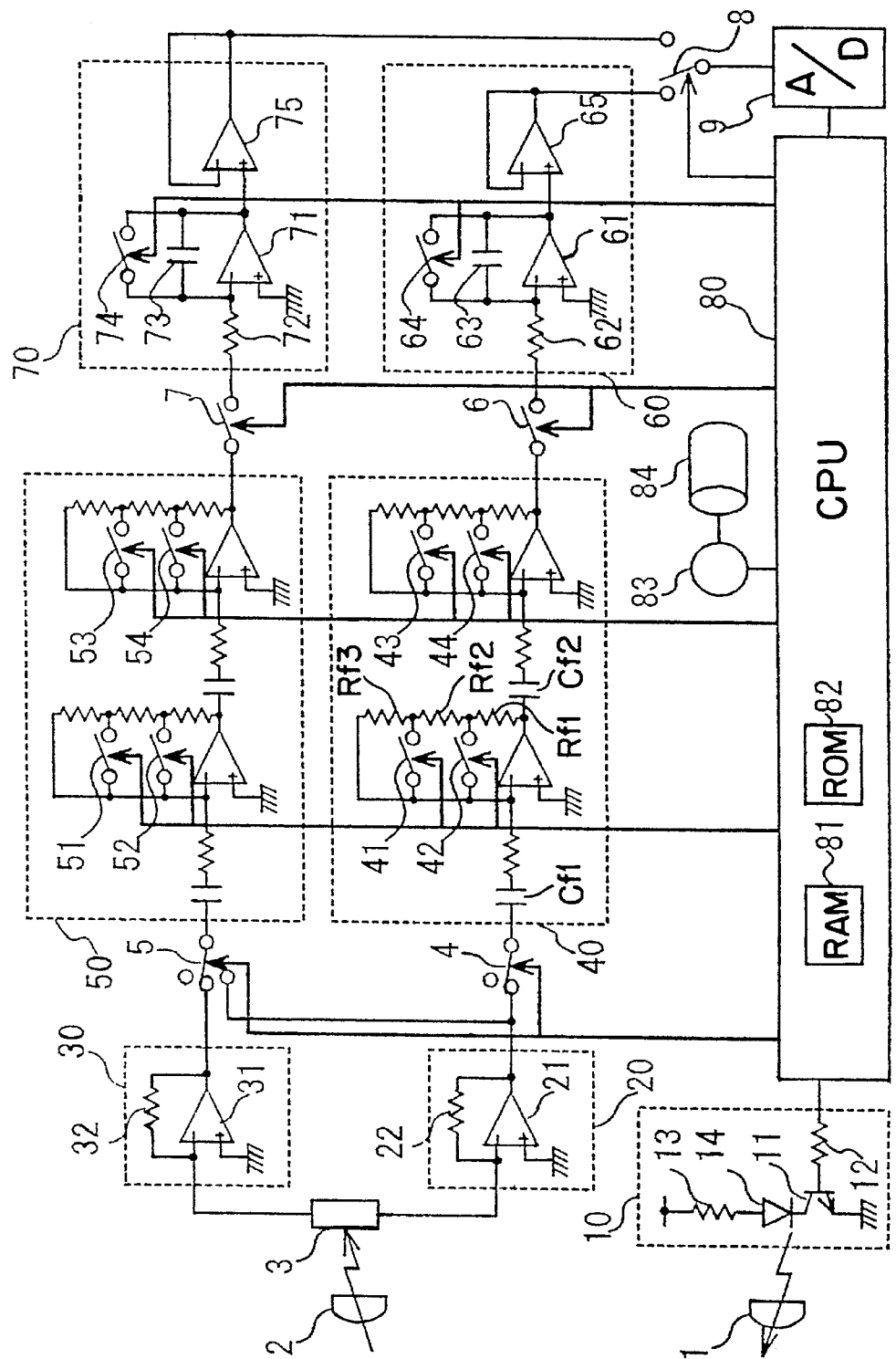
FIG. 1 is a circuit diagram showing a first embodiment of the present invention.

The construction of the present invention is explained in conjunction with the circuit diagram shown in FIG. 1. A light projection circuit 10 serves as a driving circuit for driving a near-infrared light emitting device (hereinafter referred to as an IRED) 14 and comprises a transistor 11, a base resistor 12, a resistor 13 and the IRED 14. The IRED is preferably pulse driven. When a calculation circuit 80 (hereinafter referred to as CPU) generates a light projecting signal, the IRED 14 emits light. The light emitted by the IRED 14 passes through a light projecting lens 1 and is partially reflected by an object (not shown) to be irradiated with the light. Part of the reflected light passes through a light receiving lens 2 and is projected on a semiconductor position sensitive detector (hereinafter referred to as a PSD) 3.

A first current-voltage converting circuit 20 and a second current-voltage converting circuit 30 comprise a light receiving circuit together with the PSD 3. When light is projected onto the PSD 3, the PSD 3 generates a pair of current current corresponding to the intensity and direction of the light received and supplies the current outputs to the first and second current-voltage converting circuits 20 and 30. The first current-voltage converting circuit 20 comprises an amplifier 21 and a feedback resistor 22 and generates a voltage proportional to the input current supplied by the PSD 3. The second current-voltage converting circuit 30 comprises an amplifier 31 and a feedback resistor 32, which is the same structure as the first current-voltage converting circuit 20, and generates a second voltage proportional to a current output of the PSD 3.

A switch 4 is either switched to the first current-voltage converting circuit 20 or held in an open state. When the switch 4 is switched to the first current-voltage converting circuit 20, the signal of the first current-voltage converting circuit 20 is input to a first amplifying circuit 40. When the switch 4 is open, no signal is input to the first amplifying circuit 40. A switch 5 is switched either to select the first current-voltage converting circuit 20, the second current-voltage converting circuit 30, or held in an open state. When the switch 5 is switched to select the first current-voltage converting circuit 20, the output signal of the first current-voltage converting circuit 20 is input to a second amplifying circuit 50, and when the switch 5 is switched to select the second current-voltage converting circuit 30, the output signal of the second current-voltage converting circuit 30 is input to the second amplifying circuit 50. When the switch 5 is open, no signal is input to the second amplifying circuit 50; the pole states of the switch 4 and the switch 5 are controlled by the CPU 80.

The first amplifying circuit 40 and the second amplifying circuit 50 have adjustable gains. Since these amplifying circuits have similar constructions, the first amplifying circuit 40 will be explained as an example. A capacitor Cf1 is connected to the input side of the first amplifying circuit 40 for eliminating a direct current component of the input signal. As is apparent from FIG. 1, the first amplifying circuit 40 comprises pre-amp and post-stage circuits. The pre-amp circuit stage amplifies the input signal with a pre-set gain and comprises an amplifier, three serially-connected feedback resistors Rf1, Rf2 and Rf3, and switches 41 and 42 for short circuiting these resistors. The switch 41 short circuits the resistor Rf3 and the switch 42 short circuits the resistor Rf2 and the resistor Rf3, thereby permitting setting the; of the gain of the pre-amp circuit to any of three stages. In other words, when both the switches 41 and 42 are turned OFF, the gain is maximized, when only the switch 41 is turned ON, the gain is halved, and when the switch 42 is turned ON, the gain is halved again.

The output signal from the pre-amp circuit passes through a capacitor Cf2 and is amplified again at the post-amp circuit stage. The post-amp circuit comprises, like the pre-amp circuit, one amplifier, three serially-connected feedback resistors, and switches 43 and 44 for short circuiting these feedback resistors, and is capable of setting the gain to any of three values depending on the state of the switches 43 and 44. In other words, the overall gain of the first amplifying circuit 40 can be set to any of five values; by selectively turning ON the switch 41, the switch 43, the switch 42 and the switch 44 in a desired order.

The output of the post amp circuit is input to a first integrating circuit 60 through a switch 6. The second amplifying circuit 50 has the same construction as the first amplifying circuit 40 and comprises pre-amp and post-amp circuits. The overall gain of the second amplifying circuit 50 is successively halved by closing the switch 51, the switch 53, the switch 52 and the switch 54 in successive order. Thus the gain can be set to any of five values. The output of the second amplifying circuit 50 is input to a second integrating circuit 70 through a switch 7.

The first integrating circuit 60 and the second integrating circuit 70 are provided for integrating the output signals from the amplifying circuits 40 and 50. Since the integrating circuits have the same construction only, the first integrating circuit 60 will be explained as an example. The switch 6 is connected to the input side of the first integrating circuit 60, and when the switch 6 is turned ON, the output signal of the first amplifying circuit 40 is supplied to the first integrating circuit 60. The first integrating circuit 60 comprises an amplifier 61, an input resistor 62, an integrating capacitor 63, a switch 64, and a voltage follower 65. When the switch 64 is turned ON, the integrating capacitor 63 is discharged so that the voltage Vfi between the terminals of the integrating capacitor 63 becomes 0 volts. When the switch 64 is turned OFF and the switch 6 is turned ON, integration is initiated to gradually raise the integrated voltage from Vfi=0 volts. The integrated voltage Vfi is generated via the voltage follower 65. In the second integrating circuit 70 comprises an amplifier 71, an input resistor 72, an integrating capacitor 73, a switch 74 and a voltage follower. The same manner, the second integrating circuit 70 integrates the output signal of the second amplifying circuit 50 to gradually raise an integrated voltage Vni between the terminals of the integrating capacitor 73. The integrated voltage Vni is generated via a voltage follower 75. The switch 8 selects either the output of the voltage follower 65 or the output of the voltage follower 75 to be transmitted to an A/D converter 9. The A/D converter 9 converts either output thereof into a digital value to be transmitted to the CPU 80. The CPU 80 converts the integrated voltage Vfi and the integrated voltage Vni to a voltage Vf and a voltage Vn, respectively, which are assigned appropriate addresses in a readable and writable volatile memory 81 (random access memory, referred to as a RAM).

The RAM 81 is used for calculations in the CPU 80 and for temporarily storing a count value and a flag. Count values such as Ns, Ne, N, Nf and Nn, and flags such as Ff and Fn which will be explained below are assigned to an appropriate address therein. Also, the RAM 81 temporarily stores variables such as Vfd, Vnd, Vfo, Vno, Vth, Vfi, Vni, R, Ti and T5. Furthermore, a readable nonvolatile memory 82 (read-only memory, referred to as a ROM hereinafter) is used for semi-permanently storing a program and control data of the CPU 80.

Next, a description of the operation of the circuit according to the first embodiment of the present invention will be explained. When the operation of the circuit enters a distance measurement routine, the power source for all the circuits in FIG. 1 is turned ON. Then the content of the RAM 81 is cleared so that the optimal gains of the first amplifying circuit 40 and the second amplifying circuit 60 are determined. During this gain determining operation, a frequency Nf representing the characteristics of the first amplifying circuit 40 and the first integrating circuit 60 and a frequency Nn representing the characteristics of the second amplifying circuit 50 and the second integrating circuit 70 are determined. In addition, when the brightness of an object to be photographed is judged to be very high, the near flag Fn in the RAM 81 is set. In such a case, distance is not measured, the object is regarded as being located at the nearest measurable distance, and a value X is set to 1. Subsequently, offset voltages of the first amplifying circuit 40 and the second amplifying circuit 50 are measured and the amplification ratio of the two circuits is calculated so that constants such as an offset voltage Vfd, an offset voltage Vnd and a ratio R are determined to reduce circuit differences between the two amplifying circuits. Then a distance to the object to be photographed is obtained by performing a distance measuring operation, and the operation of the circuit subsequently enters the exposure operation.

Figure 2:
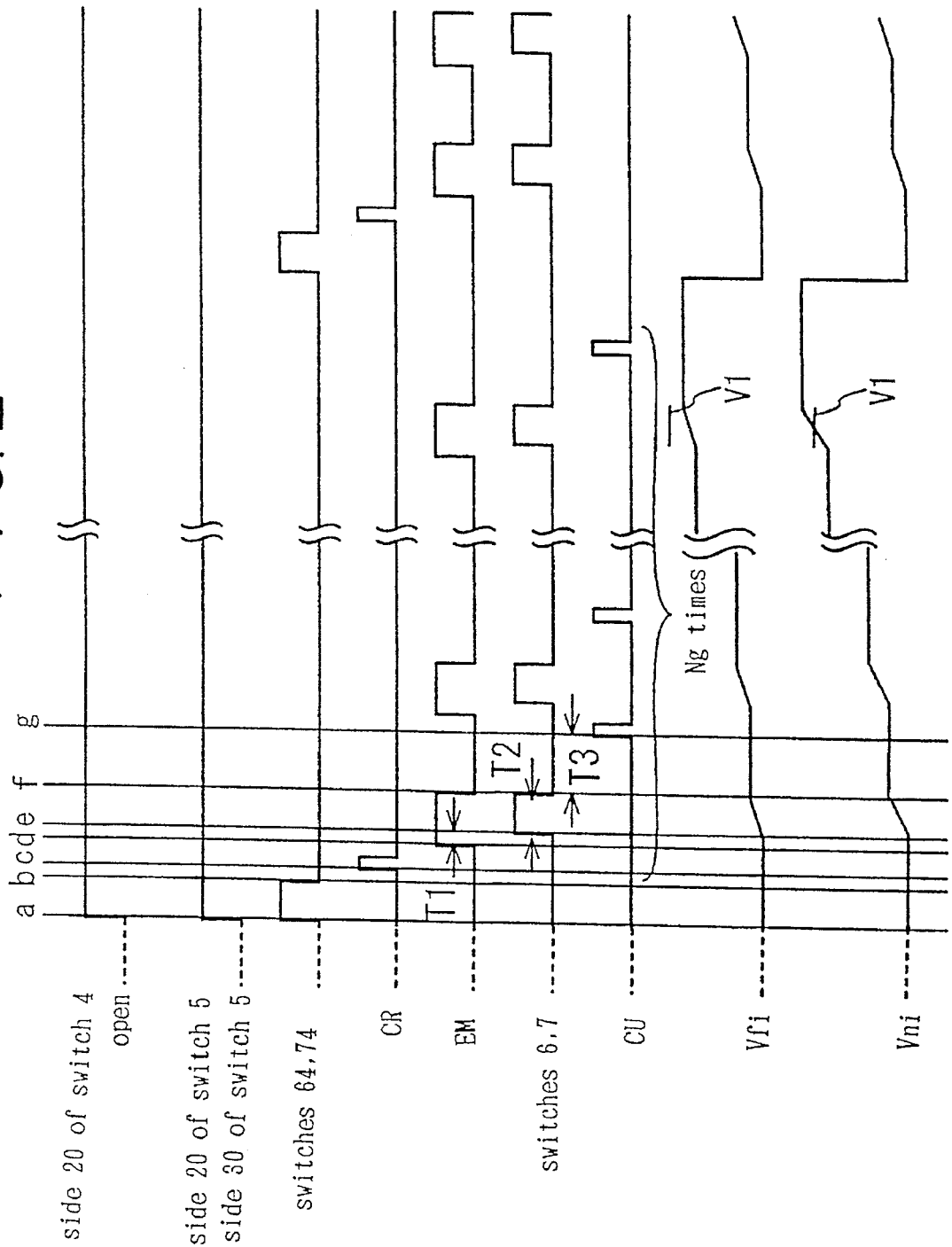
FIG. 2 is an operational diagram for explaining an integration operation of the first embodiment of the present invention.

Next, the operation for determining the gains of the first amplifying circuit 40 and the second amplifying circuit 50 will be explained in detail in conjunction with FIG. 2. At first, the CPU 80 switches the switch 4 to select the first current-voltage converting circuit 20. Subsequently, the switch 64 and the switch 74 are turned ON to discharge the integrating capacitor 63 and the integrating capacitor 73 (see FIG. 2 at a). After these capacitors are sufficiently discharged, the switch 64 and the switch 74 are turned OFF (FIG. 2 at b) to generate a clear signal CR thereby clearing the frequency N to 0 (FIG. 2 at c). Then the CPU 80 operates the light projecting circuit 10 to generate a light projecting signal EM, thereby driving the IRED 14 for initiating light projection (FIG. 2 at d). To secure a rise time of each amplifier along with the initiation of light projection and to decrease the effects of transient variations in power source, the switch 6 and the switch 7 are turned ON at time period T1 after light projection commences, to perform an integration during time T2 (FIG. 2 at e). When integration is completed, light projection is terminated, and the switch 6 is turned OFF (FIG. 2 at f). The circuit waits for time T3 to generate a count-up signal CU to add 1 to the frequency N (FIG. 2 at g).

Figure 3:
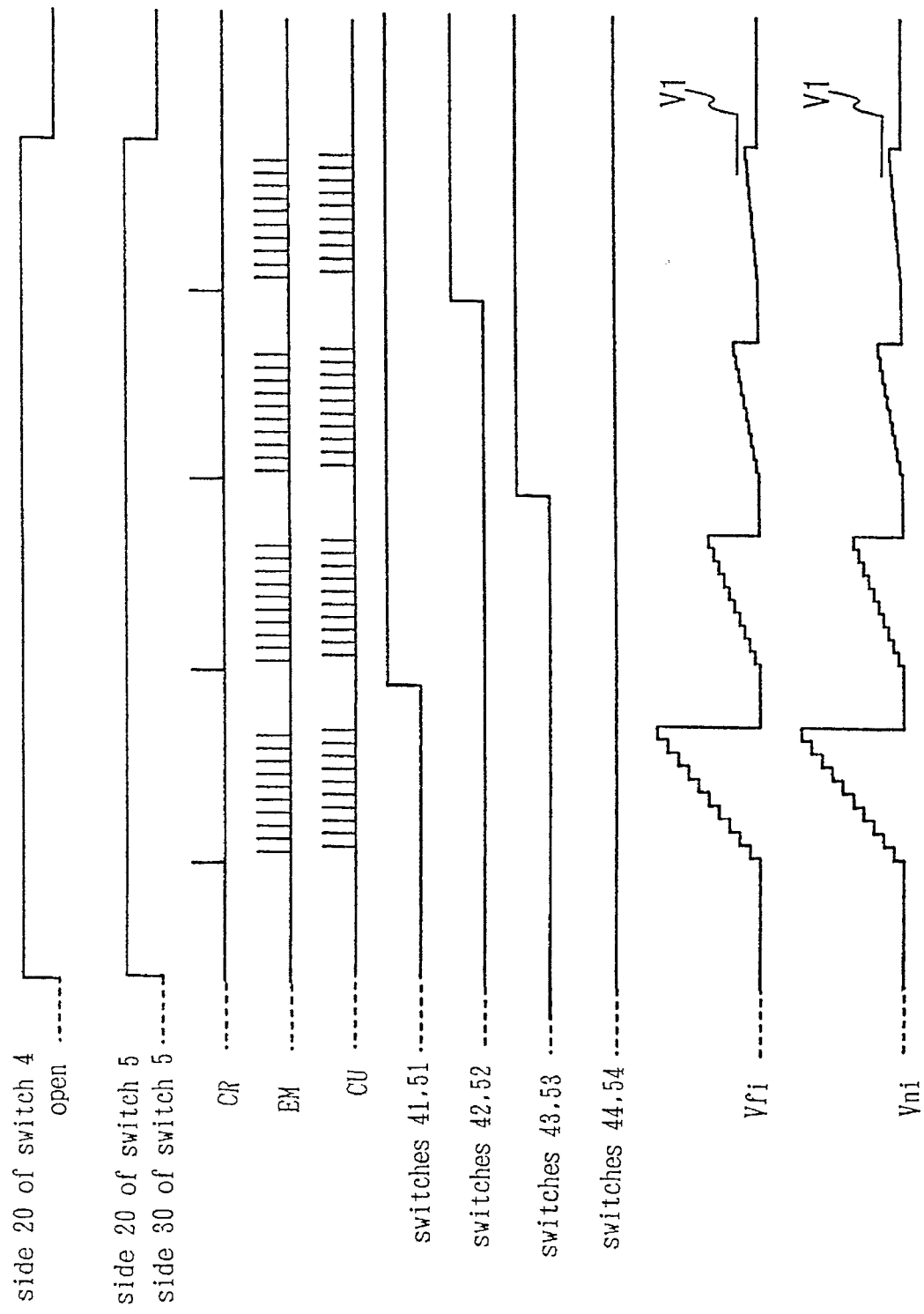
FIG. 3 is an operational diagram for explaining a series of operations at the time of gain determination according to the first embodiment of the present invention.

After the aforementioned operation is repeated a predetermined number of times Ng (for example, 10 times), the CPU 80 turns OFF the switch 64 and the switch 74 to output voltages between the terminals of the integrating capacitor 63 and the integrating capacitor 73, namely the integrated voltage Vfi and the integrated voltage Vni, to the A/D converter 9 by controlling the switch 8 in sequential order. When the output of the A/D converter 9 is larger than a predetermined voltage V1, the CPU 80 turns ON the switch 41 and the switch 51. If the output of the A/D converter 9 is less than the voltage V1, it is regarded that the optimal gain is attained. At this point, the integrated voltage Vfi and the integrated voltage Vni are subsequently read through the A/D converter 9 and are stored in an appropriate address of the RAM 81 as a voltage Vf and a voltage Vn. In the same manner if the output of the A/D converter is not less than V1, the integration operation and comparison calculation are repeated to turn ON the switches 43 and 53, 42 and 52 and 44 and 54 in sequential order. If the output of the A/D converter 9 is still larger than the voltage V1 even when all the switches are turned ON, the near flag Fn is set. This sets the overall gain of the amplifying circuit. FIG. 3 shows a case in which an optimal gain is obtained by a 4-time gain determining operation, namely when the switches 41 and 51, 43 and 53, and 42 and 52 are all turned ON.

Figure 4:
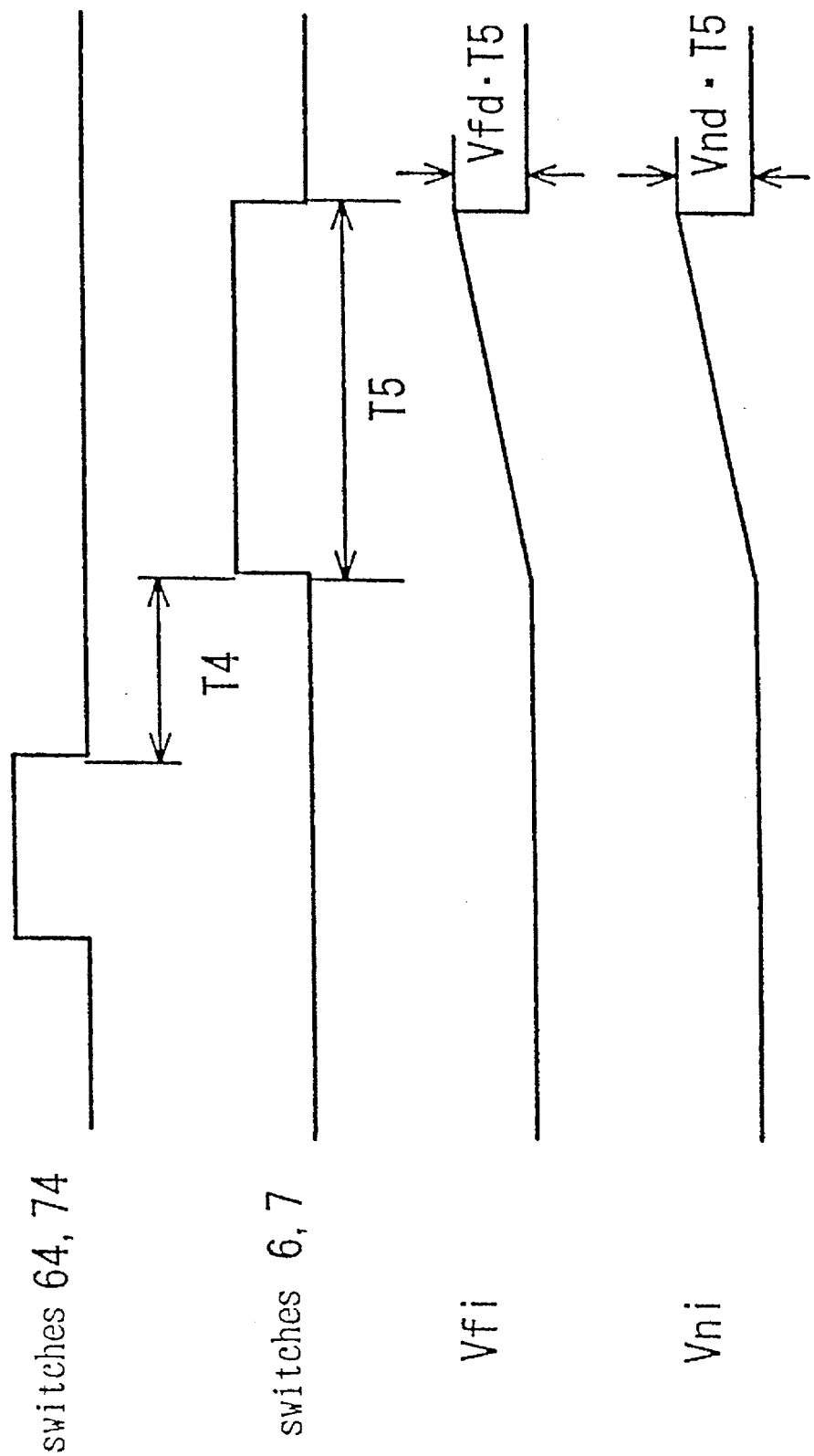
FIG. 4 is an operational diagram for explaining an operation at the time of calculation of the offset voltages Vfd and Vnd according to the first embodiment of the present invention.

Next, a method for determining the offset voltages Vfd and Vnd per unit light projecting time are explained in detail with reference to FIG. 4. First, the switch 64 and the switch 74 are turned ON to discharge the integrating capacitor 73. After sufficiently discharging the electric charge, the switch 64 and the switch 74 are turned OFF along with the switch 4 and the switch 5, thereby electrically isolating the inputs of the first amplifying circuit 40 and the second amplifying circuit 50. Subsequently, the switches 6 and 7 are turned ON after the lapse of time T4 without driving the light projecting circuit 10. Then the integration operation is initiated for time T5. During this time, an electric charge resulting from an offset voltage per unit light projecting time is accumulated in the integrating capacitor 63 and the integrating capacitor 73. After that, the integrating operation is terminated to determine the offset voltage Vfd per unit light projecting time. The offset voltage Vfd is given below both in positive and negative cases.

$$Vfd = Vfi \cdot Ti/T5 \qquad (1)$$

The voltage Vnd can be also determined in the same manner from the following expression (2):

$$Vnd = Vnf \cdot Ti/T5 \qquad (2)$$

Figure 5:
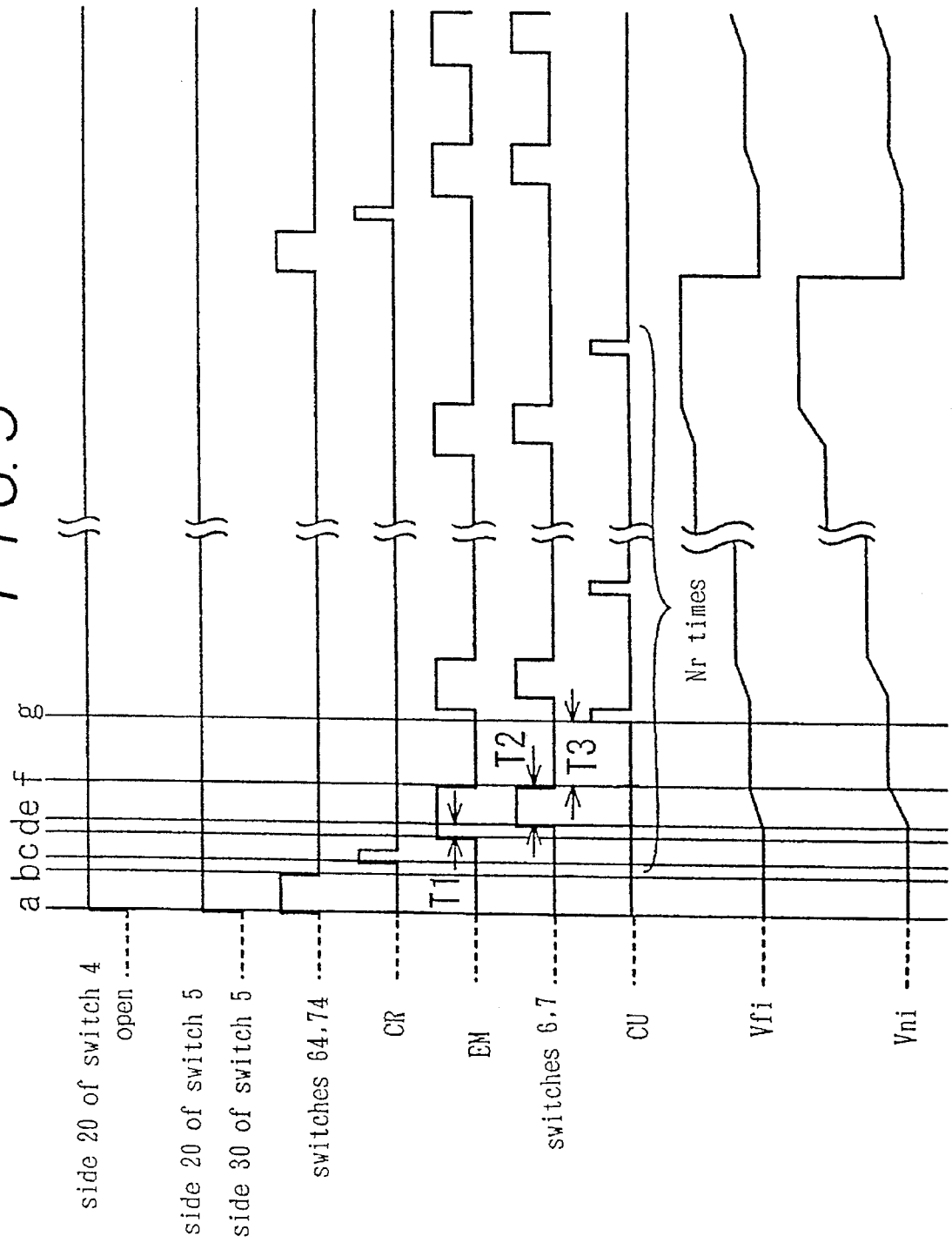
FIG. 5 is an operational diagram for explaining an operation at the time of calculation of the ratio R according to the first embodiment of the present invention.

Next, a method for determining the ratio R is explained in detail in conjunction with FIG. 5. Although the first and second amplifying circuits 40 and 50 are equivalent in terms of circuitry through the operation of the set gain determination, the object of the method is to reduce a slight difference in circuit characteristics which results from a difference in characteristics or drift in each element constituting the respective amplifying circuits. At the outset, the CPU 80 switches both switches 4 and 5 to select the first current-voltage converting circuit 20 (FIG. 5 at a). Subsequently, the switches 64 and 74 are turned ON to discharge the integrating capacitor 63 and the integrating capacitor 74 and the switch 64 and the switch 74 are then turned OFF (FIG. 5 at b). This sets the potential difference at both sides of the integrating capacitor 63 and integrating capacitor 73 to 0. The clear signal CR is then generated to clear the frequency N (FIG. 5 at c). Then the CPU 80 operates the light projecting circuit 10 to generate a light projecting signal EM to drive the IRED 14, thereby initiating light projection (FIG. 5 at d).

To secure a rise time of each amplifier together with the initiation of light projection and to decrease the effect of transient variations in the power source, the integrating circuit is operated for the time T2 after the passage of time T1 following light projection (FIG. 5 at e). After terminating the operation of the integrating circuit (FIG. 5 at f), light projection and integration are terminated for time T3, thereby generating a count-up signal CU and adding 1 to the frequency N (FIG. 5 at g). The CPU 80 adds the frequency N while repeating the operation shown in FIG. 5 at d through g until the frequency N reaches the frequency Nr. When the frequency N reaches Nr, the switch 8 and the A/D converter 9 are controlled to sequentially read the integrated voltages Vfi and Vni, determining the ratio R as shown in the following expression (3):

$$R = Vni/Vfi \qquad (3)$$

This ratio R is required for determining the distance to an object to be photographed when the distance measurement is terminated in the same manner as the aforementioned offset voltage Vfd and Vnd.

Figure 6:
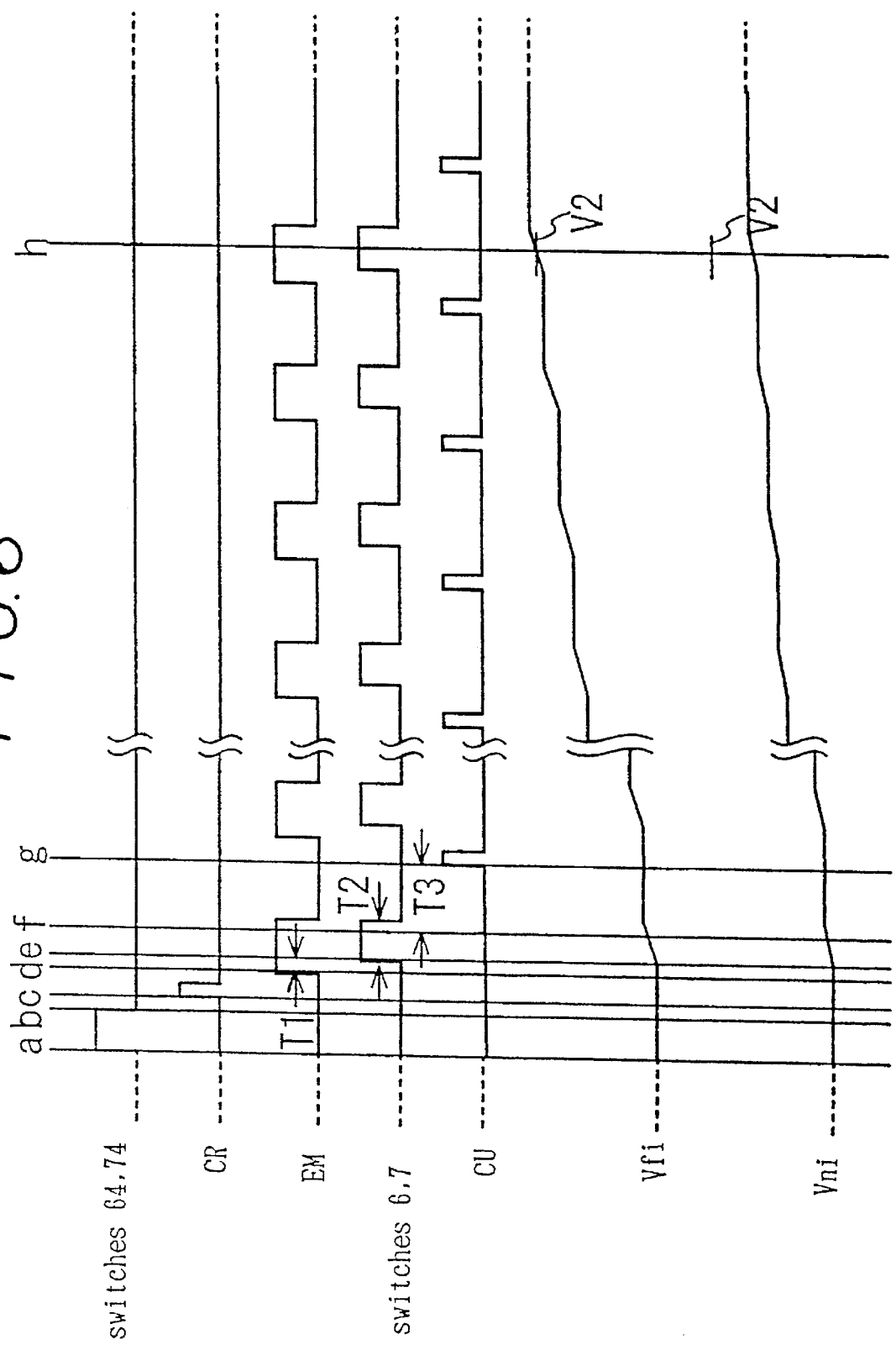
FIG. 6 is an operational diagram for illustrating the distance measurement operation according to the first embodiment of the present invention.

Next, a distance measurement operation will be explained in detail in conjunction with FIG. 6. Firstly, the CPU 80 switches the switch 5 to select the second current-voltage converting circuit 30 (FIG. 6 at a). Then the switch 64 and the switch 74 are turned ON to discharge the integrating capacitor 63 and the integrating capacitor 73 and the switch 64 and the switch 74 are then opened (FIG. 6 at b). This sets the potential difference at both sides of the integrating capacitor 63 and the integrating capacitor 73 to 0. The signal CR is then generated to clear the frequency (FIG. 6 at c). Then the CPU 80 operates the light projecting circuit 10 to generate the light projecting signal EM, thereby driving the IRED 14 to initiate light projection (FIG. 6 at d). To secure the rise time of each amplifier along with the initiation of light projection and to decrease the effect of transient variations in the power source, the integrating circuit is operated for time T2 following the passage of time T1 after light projection (FIG. 6 at e).

After termination of the operation of the integrating circuit, light projection and integration are suspended (FIG. 6 at f) for time T3, thereby generating a count-up signal CU and adding 1 to frequency N (FIG. 6 at g).

When a predetermined frequency N does not satisfy the frequency Nm (for example, 1000 times) and both the integrated voltages Vfi and Vni do not reach either of the voltages V2, the CPU 80 adds 1 to the frequency N while repeating the aforementioned operation shown in FIG. 6 at d through g. When either one of the integrated voltages Vfi and Vni reaches the voltage V2, the light projection operation is terminated at that time. Both the integrated voltage Vfi and the integrated voltage Vni are sequentially read by the CPU 80 which controls the switch 8 and the A/D converter 9. When neither one of the integrated voltages Vfi and Vni reaches the voltage V2 even when the frequency N reaches the frequency Nm, an infinite distance flag Ff in the RAM 81 is set and the operation is completed. In other cases, the following calculation is carried out to eliminate the effect of the offset voltage from the frequency Nf at the time of termination of the distance measurement.

A method for calculation is explained in conjunction with FIG. 7 and with the assumption that the offset voltage is positive. Although a voltage between the terminals of the integrating capacitors 63 and 73 at the time of termination of the distance measurement is the integrated voltage Vfi, the distance measurement should have been terminated at a smaller frequency Nf with respect to the case of a complete absence of the offset voltage because the voltage between the terminals of the integrating capacitor includes the voltage Vfo. If the offset voltage is completely absent, light should be projected at the frequency N shown in FIG. 7. The frequency Nf can be represented as the expression (4) by using the frequency N and the voltages V2, Vfo and Vni.

$$Nf = N \cdot V2 \cdot V2/Vfi \cdot (V2 - Vfo) \qquad (4)$$

Here, the voltage Vfo can be represented by the following expression (5) by using an offset voltage Vfd per unit light projection time:

$$Vfo = N \cdot Vfd \qquad (5)$$

Consequently, the frequency Nf can be calculated when the voltage Vfo is eliminated from the aforementioned expressions (4) and (5).

$$Nf = V2 \cdot V2/(Vfi \cdot V2/N - Vfd) \qquad (6)$$

This frequency Nf is stored in the RAM 81. In the aforementioned example, a method of calculation is explained with respect to a case in which the offset voltage is positive. When the offset voltage is negative, the voltage can be calculated in the same manner except for the fact that the voltage Vfo is negative.

The aforementioned description provides a method for determining the frequency Nf, but the frequency Nn can also be determined in the same manner from the following expression (7).

$$Nn = N \cdot V2 \cdot V2/Vni \cdot (V2 - Vno) \qquad (7)$$

Here, the voltage Vno is represented as an expression (5) by using an offset voltage Vnd per unit light projecting time.

$$Vno = N \cdot Vnd \qquad (8)$$

Consequently, the frequency Nn can be calculated when the voltage Vno is eliminated from the aforementioned expressions (7) and (8).

$$Nn = V2 \cdot V2/(Vni \cdot V2/N - Vnd) \quad (9)$$

Lastly, a value X given in the following expression (10) is calculated by using the frequencies Nf and Nn and the ratio R. This calculation offsets an imbalance between a circuit comprised of the first amplifying circuit 40 and the first integrating circuit 60, and a circuit comprised of the second amplifying circuit 50 and the second integrating circuit 70.

$$X = Nf/(Nf + Nn \times R) \quad (10)$$

Figure 8:
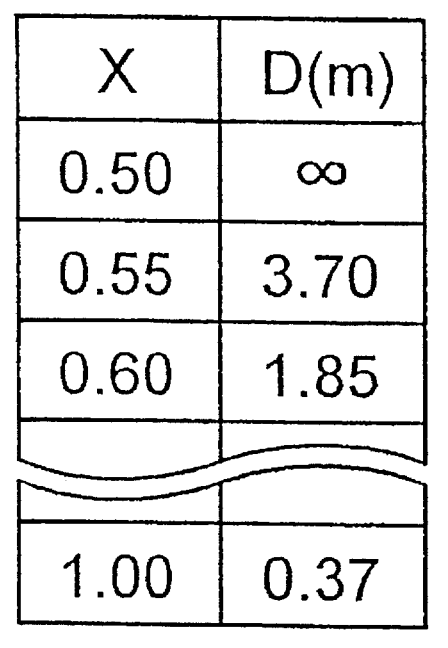

At this time, when the infinite distance flag is set, a value of 0.5 is substituted for the value X. When the near flag Fn is set, a value of 1 is forcibly substituted for the value X. In other cases, the value X is obtained by the foregoing calculation as described below with reference to FIGS. 10 and 12. Then, as shown in FIG. 8, when the value X is obtained, the distance to the object to be photographed is obtained by referring to an address of the ROM 82 that can be readily determined by obtaining the value X. Lastly, after a motor 83 is controlled to drive a lens mirror cylinder 84 to a focus position, the power source of the distance measurement circuit is turned OFF and the routine is omitted.

In the aforementioned example, the method of calculation is explained when the offset voltage is positive. When the offset voltage is negative, the offset voltage is calculated in the same manner except for the fact that the voltage Vfo becomes negative.

Figure 9:
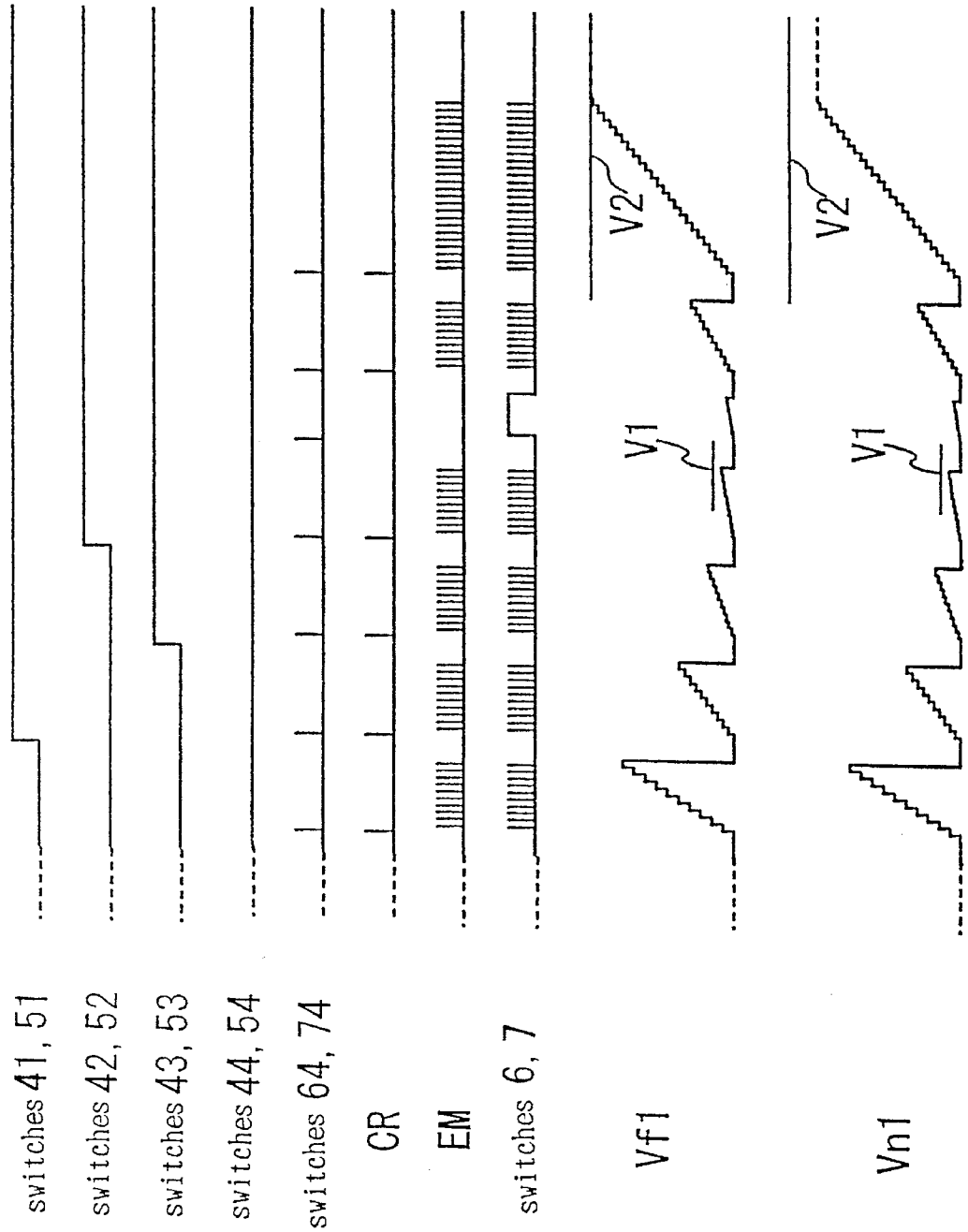
FIG. 9 is an operational diagram for explaining a series of operations at the time of distance measurement according to the first embodiment of the present invention.

The foregoing describes the circuit operation according to the present embodiment. FIG. 9 is an operational diagram showing the operation process ranging from the first gain determination of the post-amp circuits to distance measurement by the second current-voltage converting circuit 30.

Figure 10:
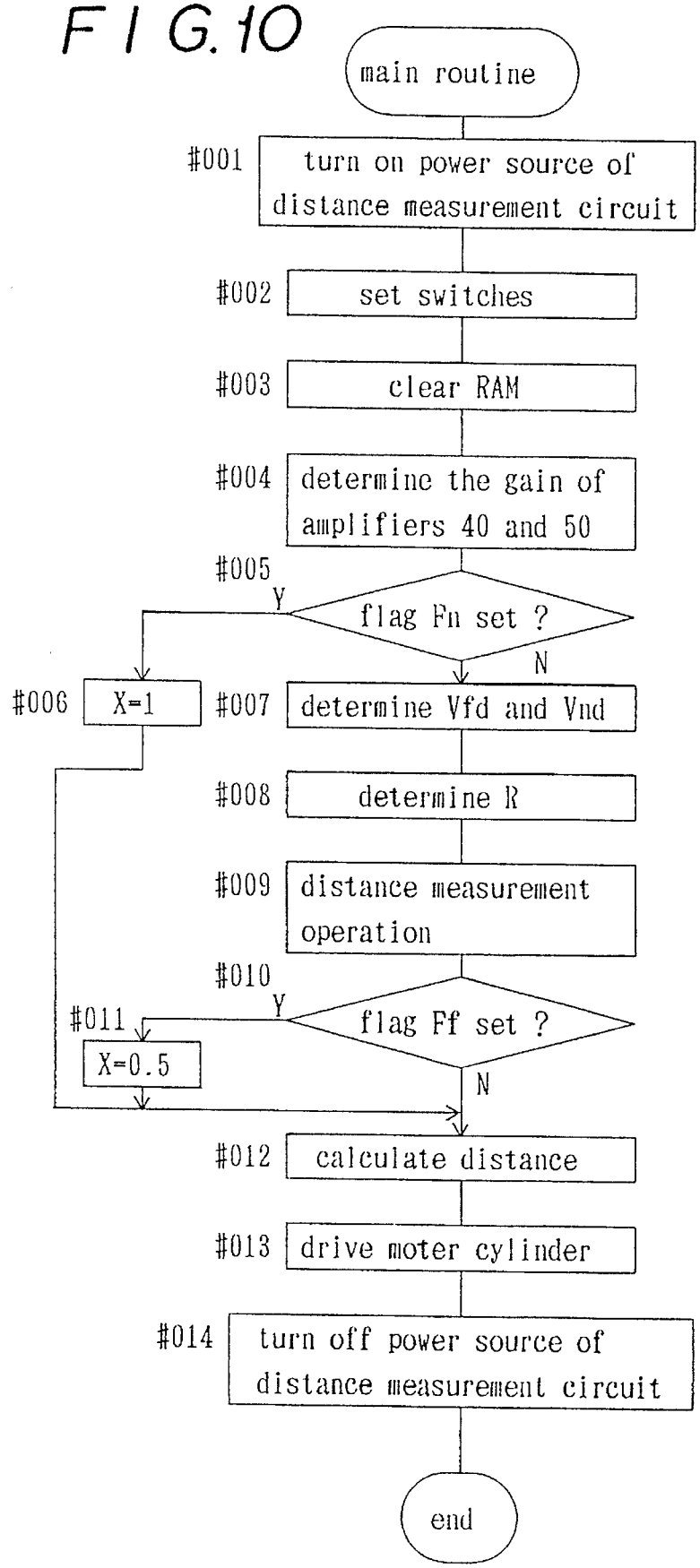
FIG. 10 is a flowchart showing an operation of the first embodiment of the present invention.
Figure 11:
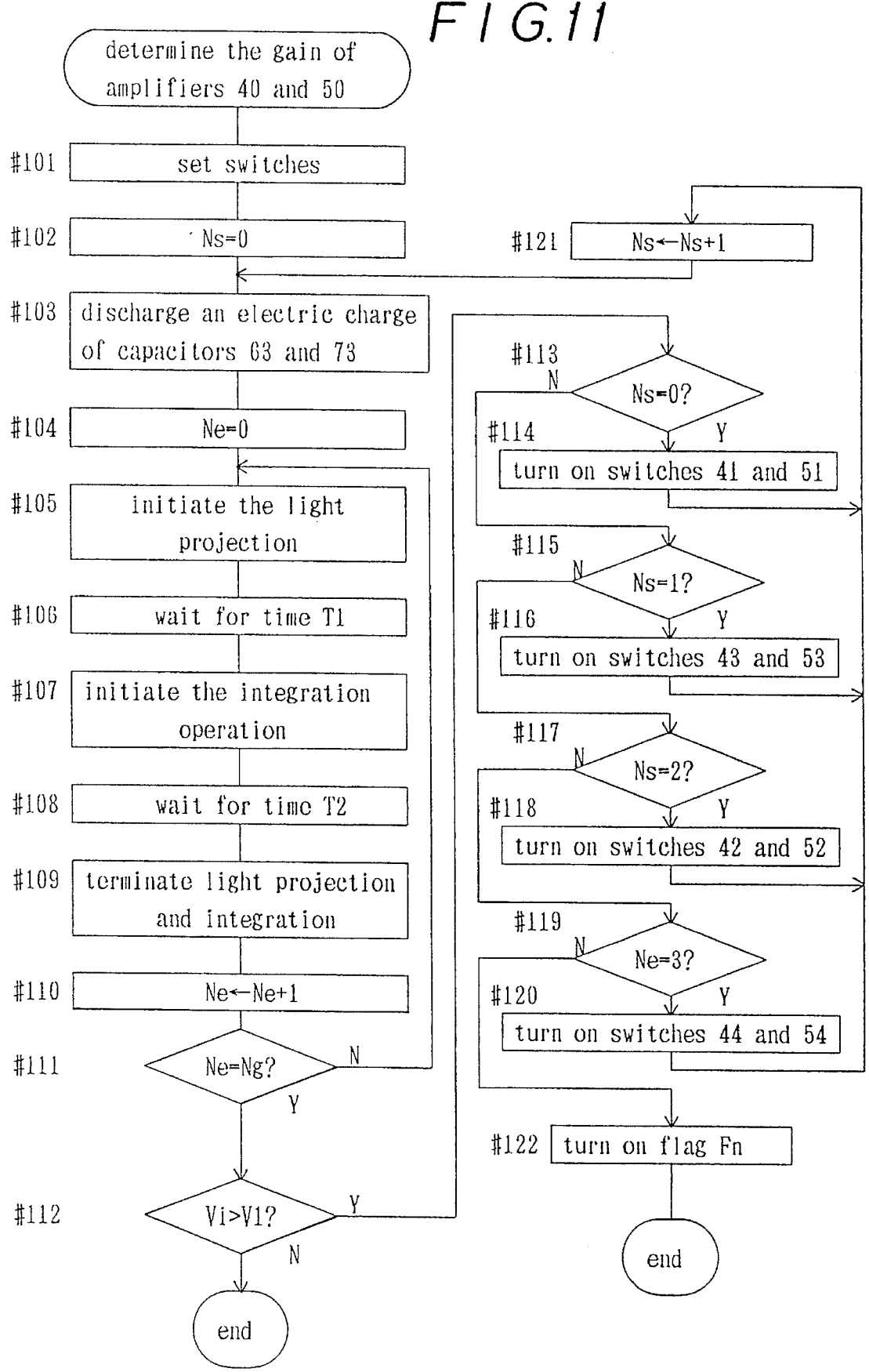
FIG. 11 is a flowchart showing a sub-routine at the gain determination portion of the first amplifying circuit 40 and the second amplifying circuit 50 in the flowchart shown in FIG. 10.
Figure 12:
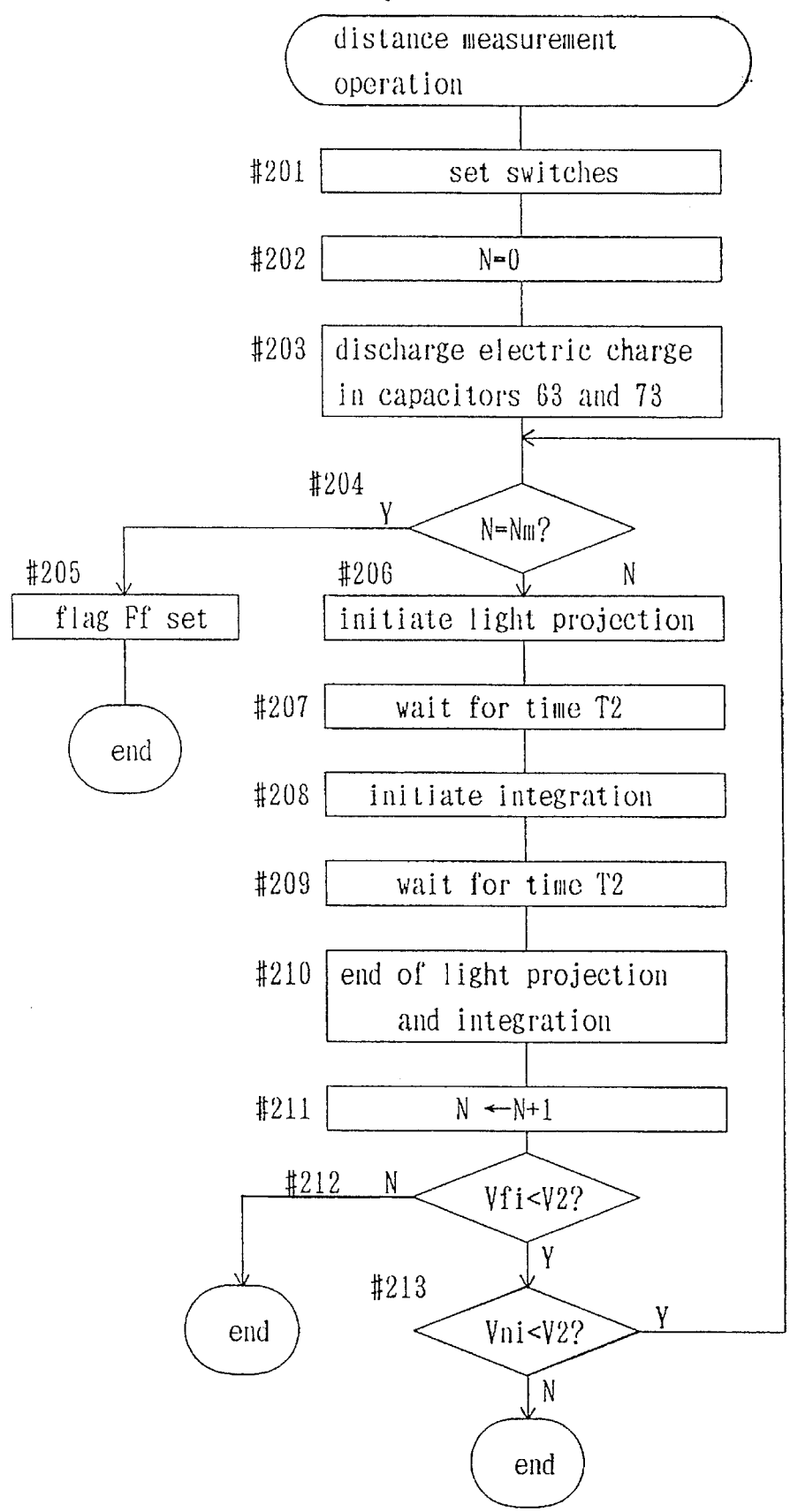
FIG. 12 is a flowchart showing a sub-routine at the distance measurement operation portion of the flowchart shown in FIG. 10.

FIGS. 10 through 12 are flow charts showing the aforementioned operation of the circuit. Firstly, a main routine is explained in conjunction with FIG. 10. When the operation process enters the distance measurement routine, the CPU 80 turns ON the power source of the entire distance measurement circuit (#001) to set each switch (#002). Then the CPU clears the content of the RAM 81 (#003). After that, the CPU 80 determines the gains of the first amplifying circuit 40 and the second amplifying circuit 50 (#004), and confirms the state of the near flag Fn (#005). If the near flag Fn is set, the CPU 80 sets the value X to 1 (which corresponds to the nearest position) (#006) and the process jumps to step #012. Subsequently, the CPU 80 determines the offset voltages Vfd and Vnd per unit light projecting time (#007), and a ratio R for adjusting the characteristics of the first amplifying circuit 40 and the second amplifying circuit 50 is obtained (#008). If the near flag Fn is not set, the CPU 80 measures the distance to calculate the value X (#009), then confirms the state of the infinite distance flag Ff (#010). When the infinite distance flag Fn is set, the CPU 80 sets the value X to 0.5 (corresponding to the infinite distance position) (#011) and the process jumps to #012. Subsequently, by referring to an address of the ROM 82 readily determined by the value X, the CPU 80 determines a distance to the object to be photographed (#012). Lastly, after the motor 83 is controlled and the lens mirror cylinder 84 is driven to the focusing position (#013), the CPU 80 turns OFF the power source of the distance measuring circuit (#014) and exits this routine.

Next, the operation in each of the subroutines will be explained. First, the subroutine for determining the gain of the post-amp circuits (the first amplifying circuit 40 and the second amplifying circuit 50) will be explained in conjunction with FIG. 11. When the entire operation process enters the subroutine for determining the gain of the post-amp circuit, the CPU 80 switches the switch 4 to select the first current-voltage converting circuit 20 while turning OFF all the other switches (#101). The CPU 80 clears the frequency Ns to 0 (#102) and turns ON the switch 64 and the switch 74 to discharge an electric charge accumulated in the integrating capacitor 63 and integrating capacitor 73, thereafter turning OFF the switch 64 and the switch 74 (#103) and generating a clear signal CR to clear the frequency Ne to 0 (#104).

Next, the CPU 80 generates a light projecting signal EM to operate the light projecting circuit 10 for initiating light projection (#105) and waits for time T1 (#106) and the CPU 80 then turns ON the switch 6 and the switch 7 for a time T2 while performing an integration operation (#107). During this time, an electric charge is accumulated in the integrating capacitor 63 and the integrating capacitor 73 (#108). Then the operation of the light projecting circuit 10 is terminated to suspend the light projection operation, the switch 6 and switch 7 are turned OFF to suspend the integration operation (#109) and a count-up signal CU is generated to add 1 to the frequency Ne (#110). If the frequency Ne is less than a predetermined frequency Ng, the operation jumps to #105 (#111). When the frequency N reaches the frequency Ng, the CPU turns OFF the switches 6 and 7, and sequentially reads out the integrated voltage Vfi and then compares it to a predetermined voltage V1 (#112). When the integrated voltage Vfi is equal to or less than the predetermined voltage V1, the CPU 80 reads the integrated voltage Vfi and the integrated voltage Vni to store them in an appropriate address of the RAM 81, and returns to the main routine.

When both the integrated voltages Vfi and Vni are higher than the voltage V1, the CPU turns ON the switches 41 and 51 (#114) if the frequency Ns is 0 (#113), turns ON the switches 43 and 53 (#116) if the frequency is 1 (#115), turns ON the switches 42 and 52 (#118) if the frequency Ns is 2 (#117), and turns ON the switches 44 and 54 (#120) if the frequency Ns is 3 (#119), then adds 1 (#121) to the frequency Ns and returns to step #103. If the frequency Ns is none of 0 through 3, the near flag Fn is set (#122), thereby exiting this subroutine and returning to the main routine.

Next, the subroutine for measuring distance and calculating the value X is explained in conjunction with FIG. 12. When the operation process enters a subroutine for calculating the value X, the CPU 80 switches the switch 5 to the side of the second current-voltage converting circuit 30 while turning OFF the switch 6, the switch 7, the switch 64 and the switch 74 and leaving the other switches as they are (#201). Then the CPU 80 generates the clear signal CR to clear the frequency N to 0 (#202). The CPU 80 turns ON the switch 64 and the switch 74 to discharge electric charge accumulated in the integrating capacitor 63 and the integrating capacitor 73, then turns OFF the switch 64 and the switch 74 (#203). Next, the CPU compares the frequency N with Nm (#204). When the frequency N reaches Nm, the infinite distance flag Ffi is set to pass through this routine (#205). Subsequently, the CPU 80 generates the light projecting signal EM to operate the light projecting circuit 10, thereby initiating light projection (#206). After waiting for a time Ta (#207), the CPU 80 turns ON the switch 6 for a time T2 (#209) while performing an integration operation (#208). During this period, an electric charge is accumulated in the integrating capacitor 63 and the integrating capacitor 73. Then, the CPU 80 terminates the operation of the light projecting circuit to suspend the light projection operation. Subsequently, the CPU 80 turns OFF the switch 6 and the switch 7 to terminate the integration operation (#210), then generates a count-up signal CU to add 1 to the frequency N (#211).

Next, the CPU 80 compares the integrated voltage Vfi with the voltage V2 (#212). When the integrated voltage Vfi is lower than the voltage V2, the CPU 80 jumps to #213. If the integrated voltage Vni is lower than V2, the CPU jumps to #204. When either one of the integrated voltage Vfi or Vni is equal to or higher than the voltage V2, the CPU 80 returns to the main routine.

Figure 13:
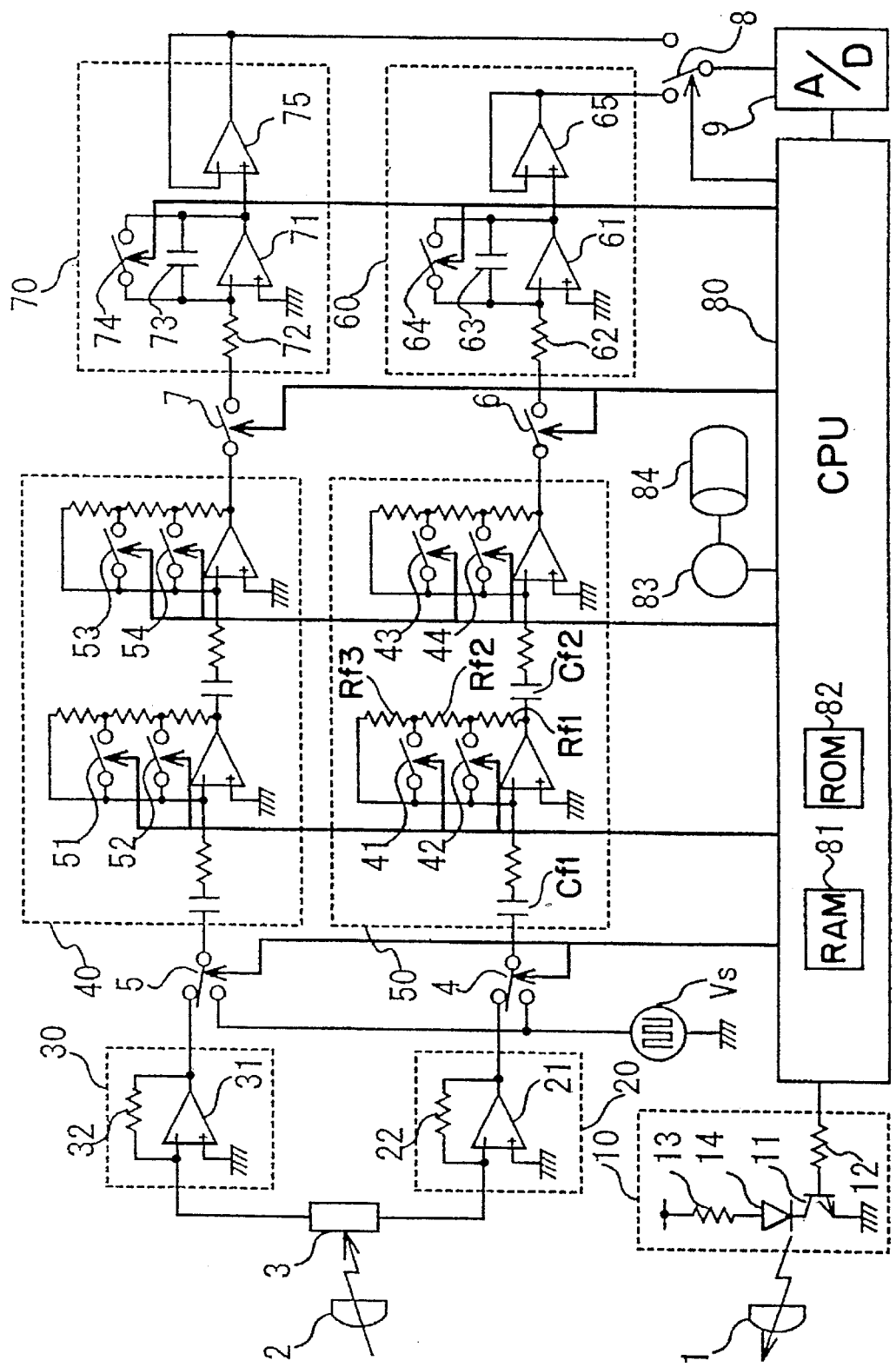
FIG. 13 is a circuit diagram showing a second embodiment of the present invention.
Figure 14:
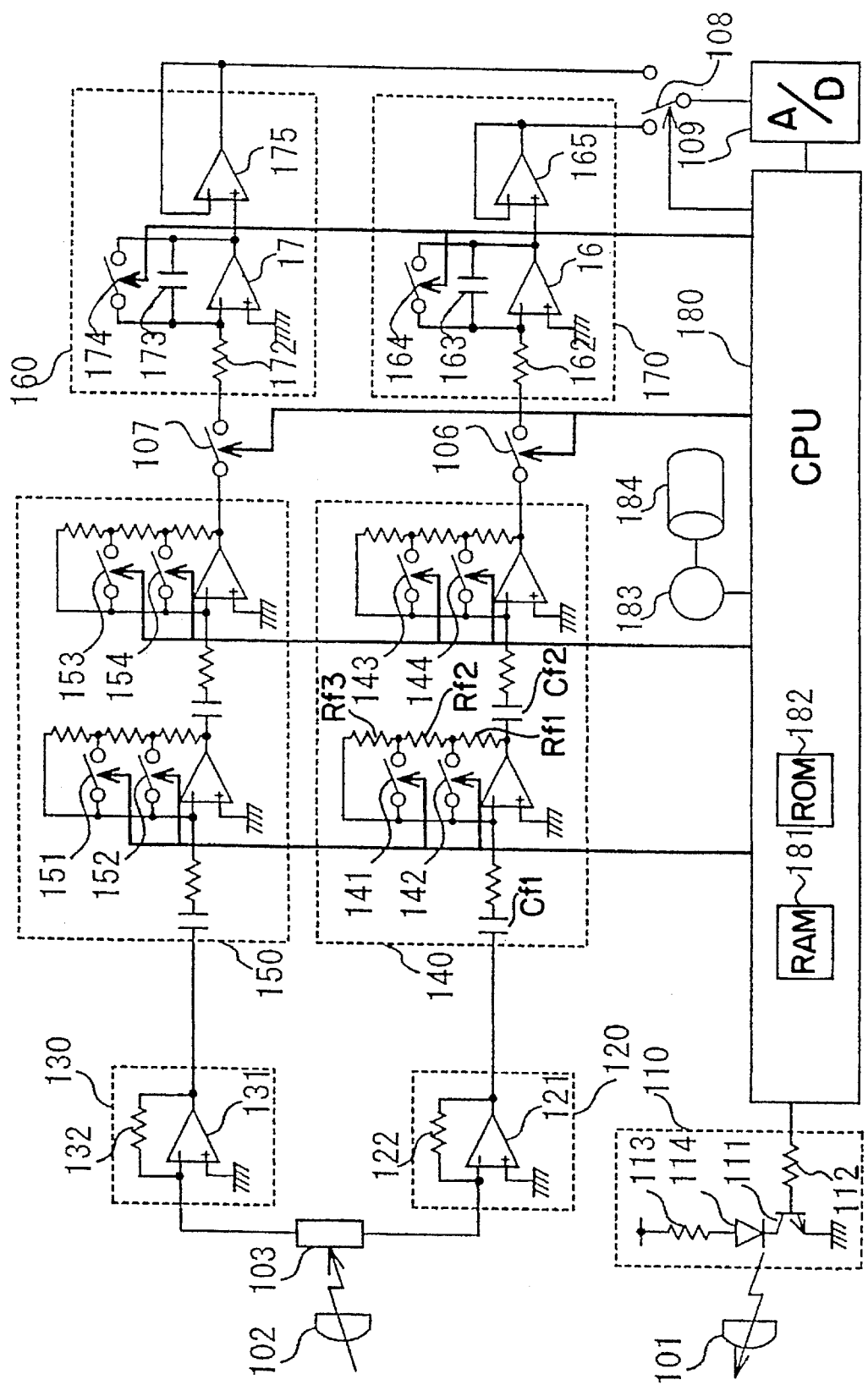
FIG. 14 is a circuit diagram showing a conventional distance measuring apparatus.

As a second embodiment of the present invention, the switch 4 and the switch 5 are arranged as shown in FIG. 13 to be connected to a voltage generating means VS. The light projecting circuit 10 is a driving circuit for driving the near-infrared light emitting device 14 (hereinafter referred to as IRED) and comprises a transistor 11, a base resistor 12, a resistor 13 and IRED 14. When an appropriate output signal is output from a calculation circuit 80 (hereinafter referred to as a CPU), the IRED 14 emits light. The emitted light passes through a light projecting lens 1 to be partially reflected by an object to be photographed (not shown). Part of the reflected light passes through the light receiving lens 2 and is projected on the semiconductor position detector 3. In actuality, the IRED 14 is pulse driven.

The first current-voltage converting circuit 20 and the second current-voltage converting circuit 30 comprise a light receiving circuit together with the semiconductor position sensitive detector 3 (hereinafter referred to as PSD). When light is projected on the PSD 3, the PSD 3 outputs a current corresponding to the intensity and direction of the light. The first current-voltage converting circuit 20 comprises an amplifier 21 and a feedback resistor 22 and generates a voltage proportional to an input current, and the second current-voltage converting circuit 30 comprises an amplifier 31 and a feedback resistor 32, has exactly the same constitution as the first current-voltage converting circuit 20 and generates a voltage corresponding to an input current. The voltage generating means Vs is a pulse voltage source for outputting a reference voltage Vs. A switch 4 supplies the output of either the first current-voltage converting circuit 20 or the voltage generating means VS to the first amplifying circuit 40, and a switch 5 supplies the output of either the first current-voltage converting circuit 20 or the voltage generating means VS to the second amplifying circuit 50. The CPU 80 controls the states of the switch 4 and the switch 5. In this case, the voltage Vf and the voltage Vn are adjusted independent of the gain determining operations of the first amplifying circuit 40 and the second amplifying circuit 50.

In the foregoing first and second embodiments of the present invention, the systems for treating the output current in the light receiving device are explained as comprising two systems. In the same manner, a distance measurement device having three systems can be similarly treated to reduce a circuit imbalance in each system. In addition, readable and writable non-volatile memories such as a ROM or an EEPROM (electrically erasable programmable read-only memory) can be incorporated in a system so that the offset voltage of each circuit and the adjustment value of the gain are written in the aforementioned memory during shipment and adjustment is not required during distance measurement. Thus a higher speed operation can be expected.

Moreover, since an output voltage which is generated at the time of distance measurement is adjusted by treating outputs at different ends of the light receiving element, circuit imbalance between the two systems is offset, with the result that precision in distance measurement is improved.

We claim:

1. A distance measuring apparatus for a camera, comprising: light projecting means for projecting a light onto an object to be photographed; light receiving means for receiving light projected by the light projecting means and reflected by the object to be photographed and converting the received light into first and second output signals in accordance with the intensity and direction of the received light; first selecting means for selecting the first output signal; second selecting means for selecting one of the first and second output signals; first signal processing means connected to the first selecting means for processing the first output signal and producing output data including distance measurement data and adjustment data; second signal processing means connected to the second selecting means for processing the output signal selected by the second selecting means and producing output data including distance measurement data and adjustment data; control means for performing a distance measurement operation by controlling the light projecting means to project a light, controlling the first selecting means to select the first output signal and controlling the second selecting means to select the second output signal, such that the first and second signal processing means process the first and second output signals, respectively, to output distance measurement data, and for performing an adjustment operation by controlling the first selecting means to select the first output signal and controlling the second selecting means to select the first output signal, such that the first and second signal processing means each process the first output signal to output adjustment data; a first memory for storing the distance measurement data a second memory for storing the adjustment data; and calculating means for calculating a distance to the object by adjusting the distance measurement data stored in the first memory using the adjustment data stored in the second memory.

2. A distance measuring apparatus according to claim 1; wherein the light receiving means comprises a light receiving element for receiving the light reflected by the object to be photographed and converting the reflected light into first and second current outputs, first current-voltage converting means for converting the first current output into a voltage which comprises the first output signal, and second current-voltage converting means for converting the second current output into a voltage which comprises the second output signal.

3. A distance measuring apparatus according to claim 2; wherein each of the first and second current-voltage converting means comprises an operational amplifier and a feedback resistor.

4. A distance measuring apparatus according to claim 1; wherein the first processing means comprises first amplifying means connected to the first selecting means for amplifying the first output signal, and first integrating means for integrating an output of the first amplifying means.

5. A distance measuring apparatus according to claim 4; wherein the second processing means comprises second amplifying means connected to the second selecting means for amplifying the output signal selected by the second selecting means, and second integrating means for integrating an output of the second amplifying means.

6. A distance measuring apparatus according to claim 5; wherein each of the first and second amplifying means comprises a pre-amplifier circuit and a post-amplifier circuit.

7. A distance measuring apparatus according to claim 6; wherein each of the pre-amplifier and post-amplifier circuits comprises an amplifier and a feedback loop having a plurality of feedback resistors and a plurality of switches for selectively connecting respective ones of the feedback resistors to the feedback loop to provide an adjustable gain.

8. A distance measuring apparatus according to claim 5; wherein each of the first and second integrating means comprises an amplifier, an input resistor, an integrating capacitor and a voltage follower.

9. A distance measuring apparatus for a camera, comprising: light projecting means for projecting light onto an object to be photographed; light receiving means for receiving light projected by the light projecting means and reflected by object to be photographed and converting the received light into first and second current outputs in accordance with the intensity and direction of the received light; first current-voltage converting means for converting the first current output into a first voltage; second current-voltage converting means for converting the second current output into a second voltage; first selecting means for selecting an output signal of the first current-voltage converting means; second selecting means for selecting an output signal of the first or second current-voltage converting means; first amplifying means connected to the first selecting means for amplifying the output signal selected by the first selecting means; second amplifying means connected to the second selecting means for amplifying the output signal selected by the second selecting means; first integrating means for integrating an output of the first amplifying means; second integrating means for integrating an output of the second amplifying means; control means for performing a distance measurement operation by controlling the light projecting means to project a light, controlling the first selecting means to select the first voltage and controlling the second selecting means to select the second voltage, such that the first amplifying means and first integrating means and the second amplifying and second integrating means process the first and second voltages, respectively, to output distance measurement signals, and for performing an adjustment operation by controlling the first selecting means to select the first voltage and controlling the second selecting means to select the first voltage, such that the first amplifying means and first integrating means and the second amplifying means and second integrating means process the first voltage to output adjustment signals; means for converting the distance measurement signals and the adjustment signals into digital data comprising distance measurement data and adjustment data; a first memory for storing the distance measurement data; a second memory for storing the adjustment data by adjusting the distance measurement data stored in the first memory using the adjustment data stored in the second memory.

10. A distance measuring apparatus according to claim 9; wherein each of the first and second current-voltage converting means comprises an operational amplifier and a feedback resistor.

11. A distance measuring apparatus according to claim 9; wherein each of the first and second amplifying means comprises a pre-amplifier circuit and a post-amplifier circuit.

12. A distance measuring apparatus according to claim 11; wherein each of the pre-amplifier and post-amplifier circuits comprises an amplifier and a feedback loop having a plurality of feedback resistors and a plurality of switches for selectively connecting respective ones of the feedback resistors to the feedback loop so as to provide an adjustable gain.

13. A distance measuring apparatus according to claim 9; wherein each of the first and second integrating means comprises an amplifier, an input resistor, an integrating capacitor and a voltage follower.

14. A distance measuring apparatus for a camera, comprising:

light projecting means for projecting light to an object to be photographed;

light receiving means for receiving light projected by the light projecting means and reflected by the object to be photographed, and for converting the reflected light into first and second current outputs;

first current-voltage converting means for converting the first current output to a voltage;

second current-voltage converting means for converting the second current output to a voltage;

reference voltage generating means for generating a reference voltage;

first selecting means for selecting an output signal of the first current-voltage converting means or an output signal of the reference voltage generating means;

second selecting means for selecting an output of the second current-voltage converting means or an output of the reference voltage generating means;

first amplifying means connected to the first selecting means for amplifying the output signal selected by the first selecting means;

second amplifying means connected to the second selecting means for amplifying an output signal selected by the second selecting means;

first integrating means for integrating an output of the first amplifying means;

second integrating means for integrating an output of the second amplifying means;

first memory means for storing output voltages of the first and the second integrating means, said output voltages being generated upon operation of the light projecting means when the first selecting means selects the first current-voltage converting means and the second selecting means selects the second current-voltage converting means;

second memory means for storing output voltages of the first and the second integrating means, said output voltages being generated upon operation of the light projecting means when the first and the second selecting means both select the reference voltage generating means; and calculating means for calculating a distance to the object to be photographed by adjusting an output of the first memory means by an output of the second memory means.

15. A distance measuring apparatus as claimed in claim 14; wherein the reference voltage generating means comprises a pulse voltage source.

16. A distance measuring apparatus as claimed in claim 14; wherein each of the first and second current-voltage converting means comprises an amplifier and a feedback resistor.

17. A distance measuring apparatus as claimed in claim 14; wherein each of the first and second amplifying means comprises first and second stage amplifying circuits.

18. A distance measuring apparatus as claimed in claim 17; wherein each of the first and second stage amplifying circuits comprises an amplifier, a plurality of feedback resistors connected in series, and a plurality of switches for short-circuiting the feedback resistors.

19. A distance measuring apparatus as claimed in 14; wherein each of the first and second integrating means comprises an amplifier, an input resistor, an integrating capacitor and a voltage follower.

20. A distance measuring apparatus comprising:

light projecting means for projecting light to an object;

light receiving means for receiving light reflected by the object and converting the received light into first and second current outputs in accordance with the intensity and direction of the received light; first current-voltage converting means for converting the first current output into a first voltage signal; second current-voltage converting means for converting the second current output into a second voltage signal; reference voltage generating means for generating a reference voltage signal; first selecting means for selecting the first voltage signal or the reference voltage signal; second selecting means for selecting the second voltage signal or the reference voltage signal; first amplifying means connected to the first selecting means for amplifying the voltage signal selected by the first selecting means; second amplifying means connected to the second selecting means for amplifying the voltage signal selected by the second selecting means; first integrating means for integrating an output of the first amplifying means; second integrating means for integrating an output of the second amplifying means; control means for performing a distance measurement operation by controlling the light projecting means to project a light, controlling the first selecting means to select the first voltage signal and controlling the second selecting means to select the second voltage signal, such that the first amplifying means and first integrating means and the second amplifying means and second integrating means process the first and second voltage signals, respectively, to output distance measurement signals, and for performing an adjustment operation by controlling the first and second selecting means to select the reference voltage signal, such that the first amplifying means and first integrating means and the second amplifying means and second integrating means process the reference voltage signal to output adjustment signals; means for converting the distance measurement signals and the adjustment signals into digital data comprising distance measurement data and adjustment data; a first memory for storing the distance measurement data; a second memory for storing the adjustment data; calculating means for calculating a distance to the object by adjusting the distance measurement data stored in the first memory means using the adjustment data stored in the second memory means.

21. A distance measuring apparatus according to claim 20; wherein the reference voltage generating means comprises a pulse voltage source.

22. A distance measuring apparatus according to claim 20; wherein each of the first and second current-voltage converting means comprises an operational amplifier and a feedback resistor.

23. A distance measuring apparatus according to claim 20; wherein each of the first and second amplifying means comprises a pre-amplifier circuit and a post-amplifier circuit.

24. A distance measuring apparatus according to claim 23; wherein each of the pre-amplifier and post-amplifier circuits comprises an amplifier and a feedback loop having a plurality of feedback resistors and a plurality of switches for selectively connecting respective ones of the resistors to the feedback loop so as to provide an adjustable gain.

25. A distance measuring apparatus according to claim 20; wherein each of the first and second integrating means comprises an amplifier, an input resistor, an integrating capacitor and a voltage follower.

* * * * *